(12) United States Patent
Wu et al.

(10) Patent No.: US 8,557,319 B2
(45) Date of Patent: Oct. 15, 2013

(54) STABLE NATURAL COLOR PROCESS, PRODUCTS AND USE THEREOF

(75) Inventors: Shaowen Wu, Cincinnati, OH (US); Chad Ford, Walton, KY (US); Gregory Horn, Wyoming, OH (US)

(73) Assignee: WILD Flavors, Inc., Erlanger, KY (US)

( * ) Notice: Subject to any disclaimer, the term of this patent is extended or adjusted under 35 U.S.C. 154(b) by 334 days.

(21) Appl. No.: 12/399,223

(22) Filed: Mar. 6, 2009

(65) Prior Publication Data

US 2009/0246343 A1   Oct. 1, 2009

Related U.S. Application Data

(60) Provisional application No. 61/040,208, filed on Mar. 28, 2008.

(51) Int. Cl.
*C12C 5/04* (2006.01)
*A23D 9/013* (2006.01)
*A23B 7/157* (2006.01)
*A23L 1/27* (2006.01)
*C07D 221/02* (2006.01)

(52) U.S. Cl.
USPC ........... 426/540; 426/531; 426/262; 426/250; 546/112

(58) Field of Classification Search
USPC ................... 426/531, 540, 262, 250
See application file for complete search history.

(56) References Cited

U.S. PATENT DOCUMENTS

| 4,247,698 | A | 1/1981 | Toyama et al. |
| 4,878,921 | A | 11/1989 | Koga et al. |
| 5,270,446 | A | 12/1993 | Kyogoku et al. |
| 2004/0131733 | A1 * | 7/2004 | Rey et al. ................. 426/265 |

OTHER PUBLICATIONS

Liquefy—Webster's Third New International Dictionary Unabridged (2012).*
Andreason, K. et al., "Combined phylogenetic analysis in the Rubiaceae-Ixoroideae: morphology, nuclear and chloroplast DNA data," Am. J. Botany, vol. 87 (2000) pp. 1731-1748.
Endo, T. et al., "The constituents of *Gardenia jasminoids*: Geniposide and genipin-gentiobioside," Chem. Pharm. Bull., vol. 21(12) (1973) pp. 2684-2688.
"Domestic and Imported Foods for FDA Monitoring," 7304.004, Attachment B, Form FDA 2438g (Oct. 1991) pp. 1-2.
Paik, Y. et al., "Physical Stability of the Blue Pigments Formed from Geniposide of Gardenia Fruits: Effects of pH, Temperature, and Light," J. Agric. Food Chem., vol. 49 (2001) pp. 430-432.
Sampaio-Santos et al., "Biosynthesis Significance of Iridoids in Chemosystematics," J. Braz. Chem. Soc., vol. 12(2) (Mar./Apr. 2001).pp. 27-40.

* cited by examiner

*Primary Examiner* — Rena Dye
*Assistant Examiner* — Assaf Zilbering
(74) *Attorney, Agent, or Firm* — Frost Brown Todd LLC

(57) ABSTRACT

A method of preparing colored products from edible materials comprises processing *Genipa americana* fruit juice, which contains genipin, genipin derivatives, or pre-genipin compounds, with other edible juices or extracts which contain nitrogenous compounds such as amino acids, polypeptides, or proteins. The generated natural colored products have excellent stability and can be used in a broad range of applications including beverages, foodstuffs, drugs, dietary supplements, cosmetics, personal care stuffs, and animal feeds.

21 Claims, 1 Drawing Sheet

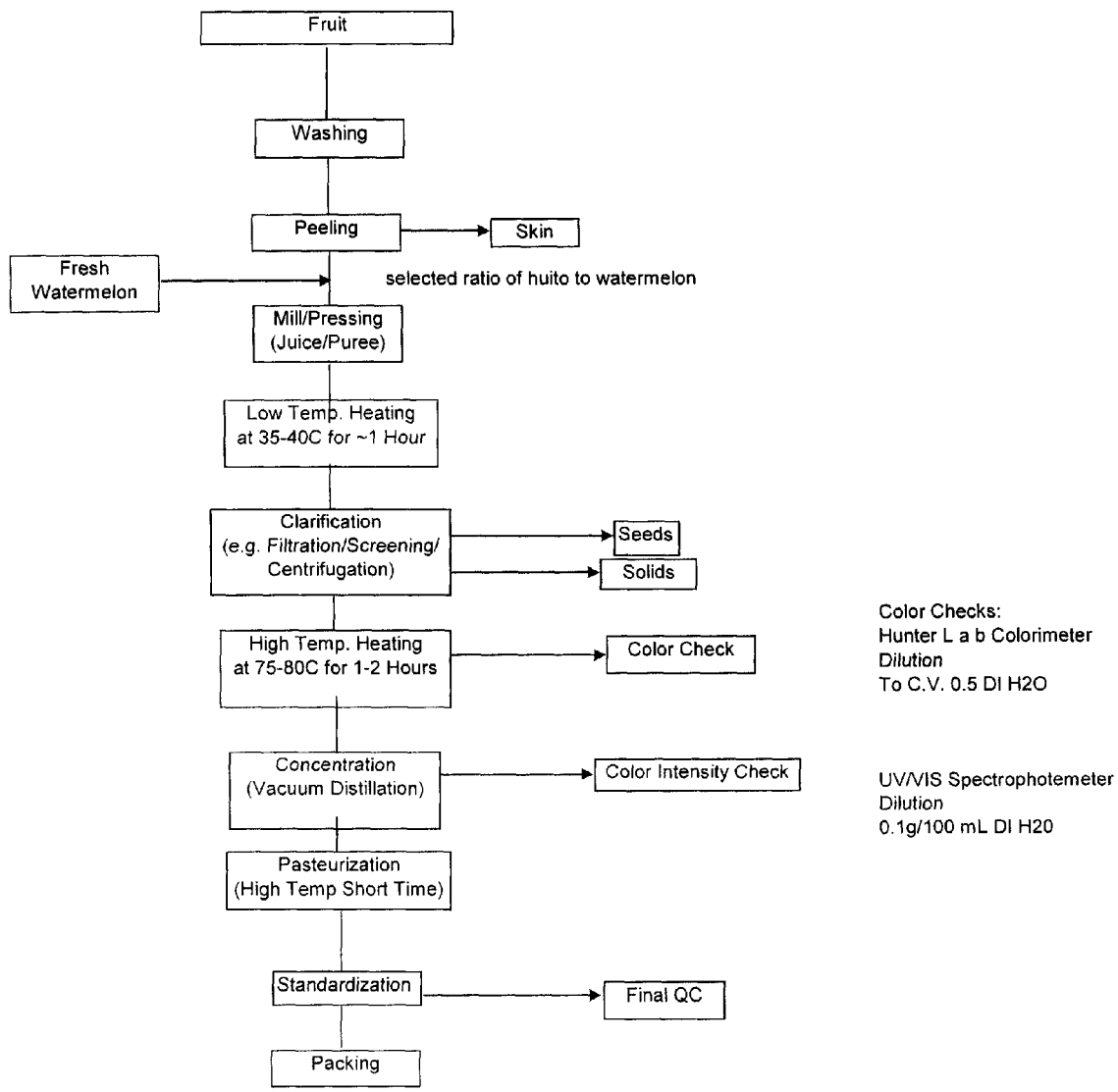

STABLE NATURAL COLOR PROCESS, PRODUCTS AND USE THEREOF

This application is related to and claims priority from U.S. Provisional Application Ser. No. 61/040,208, Wu et al, filed Mar. 28, 2008, incorporated herein by reference.

TECHNICAL FIELD

This disclosure relates to natural stable color products which can be used in a broad range of applications including foodstuffs, drugs, nutritional supplements, personal care stuffs, cosmetics, and animal feeds, and a process for preparing these colored food and edible products. Specifically, the disclosure relates to the stable color products that are generated by processing *Genipa americana* fruit juice which contains genipin, genipin derivatives, or pre-genipin compounds, together with other edible juices or extracts which contain amino acids, polypeptides, proteins, and compounds with one or more primary amine groups.

BACKGROUND

Today, a decreasing number of people are willing to eat or drink foodstuffs and use cosmetic products which are colored synthetically, resulting in a steady growth of the market for natural colorants. Thus, a natural color, especially a natural blue colorant that is stable at low pH and to temperatures used in processing, would be of significant worldwide commercial interest. The only natural blue colors commercially feasible today are those derived from gardenia fruits (*Gardenia jasminoides* Ellis). However gardenia blue is not currently available in US and Europe markets, it is only available in some Asian markets as a safe color product for food/drug applications.

*Gardenia* fruit contains a large amount of iridoids such as geniposide, gardenoside, genipin-1-b-gentiobioside, geniposidic acid and genipin (Endo, T. and Taguchi, H. Chem. Pharm. Bull. 1973). Among them genipin is a key compound contributing to the gardenia blue whenever it reacts with amino acids (U.S. Pat. No. 4,878,921). Currently *gardenia* blue is made as a chemical reaction product using geniposide extracted from *Gardenia* juice, purified genipin, or genipin derivatives, with isolated amino acids. In contrast, the process of the present invention utilizes whole fruit, puree or juice of genipin-containing plants to provide a natural color juice or concentrate.

Genipin and other iridoid compounds, such as genipic acid, genipin gentiobioside, geniposide and geniposidic acid are found also in the fruits of *Genipa americana*, also known as Genipap, or Huito, a wild plant of tropical Latin American. The mature fruits of *Genipa americana* have been commonly used by local people to make cooling drinks, jellies, sherbet, ice cream, sweet preserves, syrup, a soft drink—genipapada, wine, a potent liqueur, and tanning extract. Green or unripe fruits are used as a color source to paint faces and bodies for adornment, to repel insects, and to dye clothing, pottery, hammocks, utensils and basket materials a bluish-purple. The fruit and juices also have medicinal properties and syrups are used as cold and cough medicine. Flowers and bark of *Genipa americana* also have medicinal properties.

*Genipa americana* is also a natural source of iron, riboflavin and anti-bacterial substances, apart from the carbohydrates, sugar, proteins, ash and malic acid in its fruits. The principal biochemical compounds of *Genipa americana* include: calcium, phosphorous, vitamin C, and caffeine, caterine, genipic acid, genipin, genipin gentiobioside, genipinic acid, geniposide, geniposidic acid, gardenoside, genamesides A-D, gardendiol, deacetyl asperulosidic acid methyl ester, shanzhiside, glycerides, hydantoin, mannitol, methyl esters, tannic and tartaric acid, and tannins.

The present disclosure relates to the preparation of stable colorants by mixing and co-processing fruit juice, particularly from *Genipa americana*, with other edible juices or extracts from fruit, vegetable, plant materials, grain, legume, nuts, seeds, animal materials including milk and egg, microbial, and algal materials, which contain amino acids, or polypeptides, or proteins. The product colors are not those expected from simple pigment blending, and the color products have great stability to acidity and heating. The co-processing of *Genipa americana* fruit with other selected fruit(s) (defined broadly as above to include also grains and animal materials) to obtain the composite juice is simple and effective. The products can be used in a broad range of applications, such as foodstuffs, drugs, nutritional supplements, personal care stuffs, cosmetics, and animal feed.

SUMMARY OF THE INVENTION

The present disclosure provides a method of producing natural stable color products wherein *Genipa americana* fruits are co-processed with other edible juices or extracts from fruits, vegetables, plant materials, grains, legumes, nuts, seeds, animal materials including milk and eggs, microbial, and algal materials that contain amino acids, polypeptides, and/or proteins.

The present disclosure further provides natural color products that have desirable organoleptic properties and excellent compatibility with foods and food components, are intrinsically acceptable to consumers due to the nature of their raw materials and have certain nutritional values, and which also have very good stability over a broad pH range and good resistance in use to heat and light. Therefore, the products are suitable for use in various applications, such as foodstuffs, drugs, nutritional supplements, personal care stuffs, cosmetic, and animal feed.

BRIEF DESCRIPTION OF THE DRAWINGS

FIG. 1 is a flow chart representation of the process described in Example 3.

DETAILED DESCRIPTION OF THE INVENTION

The present disclosure provides a method of producing natural stable color products by using *Genipa americana* fruit juice with the various added edible materials. Natural stable blue color is believed to be obtained when genipin and possibly genipin gentiobioside, which naturally exist in *Genipa americana* fruit, react with amino acids, polypeptides, or proteins, and other compounds with primary amine groups, in the various edible materials. All known and practiced juice extraction techniques and operations, and processing technologies associated with non-juice components claimed, are considered suitable to prepare the color juices of this invention and are incorporated by reference herein.

Starting Materials

The starting materials used in the process of the present invention are mature fruits of *Genipa americana* L.; also known by numerous informal names: genipap, huito, jaguar, bilito, cafecillo denta, caruto, caruto rebalsero, confiture de singe, danipa, *genipa, génipa,* genipayer bitu, guaitil, guaricha, guayatil colorado, huitol, huitoc, huitu, irayol, jagua blanca, jagua amarilla, jagua colorado, jeipapeiro, juniper, maluco, mandipa, marmelade-box, nandipa, ñandipa genipapo, tapaculo, tapoeripa, taproepa totumillo, yagua, yanupa-i, yenipa-i, yenipapa bi, genipapo, huitoc, vito, chipara, guanapay, or other varieties such as jenipaporana or jenipapo-bravo. The fruit is optimal for harvest when mature in size, firm, and green to greenish brown in color; overly ripe fruits fall to the ground and decay.

Materials may be whole fruit, fruit juice, fruit puree, fruit juice concentrate, dried powder from fruits or juice, and the water-insoluble part of fruits from *Genipa americana* L or its close relatives that also contain genipin, genipin derivatives, or pre-genipin compounds. These compounds are a subgroup of the iridoid class of phytochemicals that are widely distributed, including in the Rubiaceae family. Some attention has been paid to an understanding of iridoid biosynthesis as an element of chemosystematics (Sampaio-Santos and Kaplan, J. Braz. Chem. Soc. 12 (2001)), and these data help to delineate the group of genipin-containing plants that produce fruit and juice suitable for use according to this invention. Generally, such fruits would include members of the Rubiaceae family, which contains sufficient genipin or genipin derivatives, including genipin gentiobioside, geniposide, geniposidic acid and gardenoside, to react with the other compounds defined herein to produce a colored product. It has been reported on the basis of DNA data (Andreason and Bremer, Am. J. Botany 87 1731-1748 (2000)) that *Genipa americana* comprises a clade together with *Gardenia* and *Kailarsenia*. Without restricting the scope of fruits that may be used in the present invention, mention of *Genipa americana* should be taken to include edible fruits or juices or extracts or edible parts of related plants such as *Gardenia* and *Kailarsenia* and other genipin-containing plants, including *Gardenia jasminoides* Ellis and its varieties.

Materials may be aqueous or solvent extracts from the sources described. Solvents can be those of common use in the art, including water, acetic, citric, or phosphate buffer solutions, methanol, ethanol, isopropanol, or mixtures thereof in different ratios.

The broad range of suitable edible materials comprises fruits, vegetables, grains, legumes, nuts, seeds, plant materials, animal materials including milk and eggs, microbial and algal materials, and by-products from such sources, which contain amino acids, polypeptides, and proteins. These materials can be co-processed with the fruit or fruit juice of *Genipa americana* to produce natural stable colorants, especially blue color.

The co-process fruits, fruit juice, puree, juice concentrate, dried powder or extracts may be obtained from fruits included within the groups listed by the FDA (Form FDA 2438g (10/91) (Citrus, Pome, Stone, Tropical/Subtropical, Vine Fruits and Small Fruits and Berries) such as watermelon, white grape, pineapple, lychee, cantaloupe, banana, orange, apple, pear, lemon, passion fruit, red grape, blueberry, tamarind, peach, papaya, acai, plum, guava, tangerine, borojo, cupuacu, goji, kiwi, etc.; this listing is not intended to limit the fruits that are suitable.

The co-process vegetable, vegetable juice, puree, juice concentrate, dry powder, or extracts may be obtained from vegetables included within the groups listed by the FDA (Form FDA 2438g (10/91) (Root and Tuber, Bulb, Leaf & Stem, *Brassica,* Legume, Fruiting and Curcubit Vegetables) such as bean sprouts, green cabbage, celery, onions, sweet onions, asparagus, any leaf vegetables, green beans, peas, cauliflower, broccoli, carrot, pumpkins, bell peppers, potato, sweet potato, tomato, etc.; this listing is not intended to limit the vegetables that are suitable.

The co-process grain powders, grain solutions, paste, or extracts may be obtained from grains included within the groups listed by the FDA (Form FDA 2438g (10/91) (Cereal Grains) such as wheat, barley, rice, oats, corn, sorghum, millets, rye, buckwheat, triticale, fonio, and quinoa, etc.; this listing is not intended to limit the grains that are suitable.

The co-process oilseeds, nuts, and seeds powder, solution, paste, extracts or derivatives may be obtained from such materials included within the groups listed by the FDA (Form FDA 2438g (10/91) (Legume Vegetables, Oilseeds, Tree Nuts) such as soybean, red kidney beans, lima beans, lentils, chickpeas, black-eye peas, black beans, fava beans, adzuki beans, anasazi beans, peanut, almonds, beechnut, brazils, walnuts, hazels, pistachio, cashews, macadamia, chestnuts, pecan, coconuts, pine nuts, pumpkin seeds, sesame seeds, sunflower seeds, cottonseed, etc.; this listing is not intended to limit the legumes, seeds and nuts that are suitable.

The co-process plant materials may be barley plant extract, grass extracts, tea and tea extracts, seaweeds and extracts etc.; this listing is not intended to limit the plant materials that are suitable.

The co-process animal materials may be skeletal muscle, non-muscle organs, skins, or shell extracts from mammal animals, poultry, seafood, reptiles, and milk and eggs; this listing is not intended to limit the animal materials that are suitable.

The co-process materials may be various microbial materials including yeast or yeast extracts, fungi and fungal extracts including mushrooms and algae and algae extracts etc.; this listing is not intended to limit the microbial materials that are suitable.

The co-process materials may be the extracts from any of the above sources and may comprise amino acids, polypeptides, proteins, or compounds with one or more primary amine groups. Extract solvents may be selected from those common in the art such as de-ionized water; phosphate, or citrate, or acetate, or carbonate etc. buffer solutions, alcoholic solutions or mixtures of the above extractants in different ratios.

Preparation Process for Stable Colorants

In order to produce the colorants of the present disclosure, the mature *Genipa americana* are co-processed with other fruits such as watermelon by conventional methods well known in the art in order to extract juice from fruit. After washing and/or blanching, the fruit is peeled and cut up into pieces, then milled or blended with co-process materials, extracted with or without heating, the pulp, seeds and skin material is separated by filtration, centrifugation or pressing and the clarified juice is collected. Processing may take place for up to about 8 hours, preferably about 0.1 to 4 hours, and more preferably about 0.1 to 1 hours, at a temperature of about 20-45° C. The composite juice obtained is subjected to subsequent heating to a higher temperature of about 50-95° C. for about 1 to 4 hours with suitable mixing (e.g., by shaking, agitation, or aeration) and concentrated about 2 to 10-fold using low pressure evaporation; the processing has the advantage of providing the required Juice HACCP treatment for microbial stability. Concentration also can be performed on a flash evaporator, by reverse osmosis, or ultra-filtration with a suitable membrane, thus providing a concentrate (typically a two- to ten-fold concentration factor from the expelled juice) suitable for commercial shipping, and the standardization of the resultant color at a stable and desired hue and color strength which may be adjusted by selecting the ratio of the *Genipa americana* fruits to co-process materials. The resultant color may subsequently be dried by spray drying, freeze drying or vacuum drying. Alternatively, the process of color manufacture may commence with a previously prepared Huito juice or concentrate to which the co-process material is added.

This ratio of *Genipa americana* fruits to co-process materials may be varied from about 1:0.2 to about 1:30 (by weight) depending on the quantity of amino acids and proteins in the co-process materials, and also the type or the profile of the amino acids. Specifically, when *Genipa americana* fruit is co-processed with fresh watermelon, the ratio of fruit to watermelon is from about 1:1 to about 1:24, and preferably from about 1:2 to about 1:12, and more preferably from about 1:3 to about 1:6.

Heating in the process relates to enzyme reactions, color development, and color stability. Without wishing to specify a reaction mechanism, it is believed that genipin, or genipin gentiobioside and geniposidic acid that are hydrolyzed to genipin and genipin derivatives by heating or the action of beta-glucosidases that exist naturally in the *Genipa americana* fruits, reacts with proteins and amino acids in the fruits to produce the resultant color (Paik, Y.; Lee, C.; Cho, M.; and Hahn, T. in J. Agric. Food Chem. 2001, 49, 403-432). The overall reaction proceeds slowly at low or ambient temperature. To accelerate the reaction, the current disclosure uses two heating steps. First, low temperature heating is executed at about 4-about 50° C., and preferably at about 20-about 45° C. Most enzymes are active in this temperature range, including proteases which degrade protein to free amino acids, pectinases and cellulases which break down pectin and cellulose. Low temperature heating facilitates the release of chemical compounds from the cells into the aqueous solution. Second, high temperature heating is preferably at about 50-about 95° C., more preferably at about 55-about 90° C., and most preferably at about 60 to about 85° C., with mixing. During this step, the activity of beta-glucosidase is maximal, and the rate of the chemical reaction of genipin with primary amine groups in amino acids, polypeptides or proteins is also high. A significant color change can be observed. Heat may also control unwanted reactions. For example, the endogenous enzymes polyphenol oxidase and peroxidase which cause unwanted color and flavor changes in fruits and vegetables after harvesting and during processing, can be denatured by judicious heating. In the present process, the heating regime contributes to a reproducible, stable and desired resultant color.

Process additives may be added in the process. Enzymes, such as beta-glucosidase or proteases, accelerate color development; other enzymes, like cellulase, hemi-cellulase, and pectinase, increase total mass yields of juice.

The pH in the inventive process affects color development. To produce a stable blue color, the suitable pH of *Genipa americana* fruit juice and co-process materials, e.g. watermelon juice, may be from acid to basic, in the range from pH about 3 to about 8, preferably from pH about 3.5 to about 7, and more preferably from pH about 4 to about 6. To produce a stable reddish color, the pH of *Genipa americana* fruit juice is adjusted to greater than pH about 10, preferably pH greater than about 12. Under alkaline conditions, the iridoid compounds are hydrolyzed and lose the methyl group from the —COOCH$_3$ group at the C-4 position, resulting in a —COO$^-$ group at C-4 position (U.S. Pat. No. 4,247,698 'Red coloring composite and the method for its production' Toyama, et al.). After holding at alkaline conditions for a sufficient period and at a suitable temperature, the pH is adjusted back to pH about 3-about 6, and the juice is co-processed with other materials that contain amino acids, polypeptides, or proteins to generate a reddish, or a reddish-purple color.

Other components in the co-process materials, such as antioxidants, multi-ionic metals, reducing sugars, sulfur-containing compounds and polyphenols, may take part in side reactions during the process. Therefore the color of natural stable colorants varies by change of co-process materials and processes, with a maximum absorption from wavelength 400 to 800 nm. More specifically, a brilliant blue generated by the *Genipa americana* fruit with watermelon has a maximum absorption at 585-600 nm wavelength, while a green color generated by *Genipa americana* fruit with pineapple juice has absorption maxima at 590-610 nm and 400-420 nm.

The colored solids or water insoluble materials that are obtained during filtration or centrifugation steps may also be utilized as valuable colorants.

Properties of Natural Stable Colorants

Natural colorants that are produced by using *Genipa americana* and co-processed edible materials have maximum absorptions varying from 360 to 800 nm. Specifically, the brilliant bluish colorants that are produced from *Genipa* fruit juice and watermelon juice have a maximum absorption in a spectrophotometer (Perkin Elmer UV/VIS spectrophotometer, Lambda 20, USA) in the wavelength range from 585 to 600 nm, depending on the concentration of the reactants. The Lab-values that were determined in a Hunter Color Lab calorimeter (Color Quest XE, USA) are L from 20 to 40; a-value from 5 to −2; and b-value from −5 to −25 for concentrated colorants with a color value of 2.0-10.0.

Heat stability of commonly used food colorants is very critical for applications. The natural colorants generated from this disclosure resist heat very well. After boiling at pH 3 for 30 minutes, *Genipa* blue color obtained with watermelon juice or fresh watermelon shows no significant visual changes Foods and Drink Products Containing Color Materials

*Genipa*-based natural colorants, especially blue color, have excellent thermal and acidic pH stability, and hence are particularly suitable to color foodstuffs, drugs, nutritional supplements, personal care stuffs, cosmetic, and animal feed applications to replace synthetic pigments or dyes.

*Genipa*-derived natural colorants may be used in foods and drug applications after appropriately concentrating or after diluting with either aqueous liquids or suitable approved solvents, including alcohol. Depending on the specific use, *Genipa*-derived natural colorants, either alone or mixed with other dye or pigments, may be used in a broad range of foodstuff applications including but not limited to various beverages and drinks, breakfast cereals, bakery products, pasta/noodles, confectionery, dairy products, processed meat, poultry, and seafood products, different dressings, ice creams, pickles, crackers, and so on.

The following examples are provided for the purpose of further illustrating the present disclosure but are in no sense to be taken as limiting,

EXAMPLE #1

Several frozen and thawed Huito fruits were peeled and cut into small pieces. One part of fruit, 116.0 g, was mixed with two parts of de-ionized water, 232.0 g, and blended using a high speed Laboratory Blender (Waring® Commercial) for 2 periods of 40 seconds each. Then the blended fruit puree was filtered through a No. 4 Whatman filter paper, and the filtered liquid was collected. Beta-glucosidase (Enzyme Development Corp.) was added to the filtrate at a quantity of 0.10 g per 60.0 g solution.

To five grams of the solution above in a test tube (25 ml), five grams of liquid or powder materials from fruits, vegetable, milk, soy, and meat were added in the test tube, and mixed well. Samples were left to stand at room temperature for 16 hours, and then heated to 80° C. for 0.5-2.5 hours until the color was stable. Samples were clarified by filtration, if necessary, to remove insoluble material.

Color changes of co-processed materials before and after incubation were measured in a Hunter Lab calorimeter (Color Quest XE, USA), and results are shown in Table 1.

TABLE 1

| Co-Process Materials | Before Reaction | | | Heating hours | After Reaction | | | |
|---|---|---|---|---|---|---|---|---|
| | L | a | b | | L | a | b | Visual Color |
| Watermelon concentrate, 65Brix | 26.83 | 7.13 | 2.92 | 2.0 | 24.67 | 0.11 | −1.38 | Dark Blue |
| Pineapple juice | 34.46 | 5.41 | 10.16 | 2.5 | 25.96 | −0.35 | −1.14 | Forest green |
| Lychee juice concentrate, 29Brix | 59.94 | 0.53 | 8.29 | 2.0 | 24.70 | 0.04 | −1.40 | Vibrant blue |
| Passion fruit clarified, 50Brix | 25.90 | 6.15 | 1.61 | 2.0 | 24.65 | 0.19 | −0.95 | Dark brown |
| Peach juice concentrate, 68Brix | 23.55 | 0.62 | −0.60 | 2.0 | 24.54 | 0.13 | −1.04 | Black |
| Cantaloupe juice | 33.66 | 5.24 | 6.48 | 0.5 | 24.58 | 0.03 | −1.09 | Dark blue/purple |
| Banana puree | | | | 2.5 | 31.39 | −0.35 | −1.51 | Grayish blue |
| Green bean sprout solution | 44.53 | 0.64 | 7.79 | 0.5 | 24.59 | 0.06 | −1.22 | Dark blue/purple |
| Celery juice | 29.69 | 9.22 | 5.30 | 1.0 | 24.62 | 0.04 | −1.24 | Dark blue |
| Green cabbage powder | | | | 2.0 | 24.56 | 0.04 | −1.14 | Purplish blue |
| Sweet yellow onion solution | 40.00 | −1.46 | 7.17 | 1.0 | 25.33 | 0.18 | −1.38 | Grayish purple |
| Milk, 2% | 87.80 | −2.13 | 7.37 | 2.0 | 29.00 | −1.12 | −6.96 | Creamy bright blue |
| Soy milk | 79.17 | 0.13 | 8.33 | 2.0 | 27.92 | −0.97 | −4.44 | Creamy teal blue |
| Chicken meat slurry | 74.96 | 0.62 | 9.22 | 2.0 | 24.59 | 0.09 | −1.03 | Bright purplish blue |

EXAMPLE #2

Peeled and diced Huito fruit, 150.0 g were mixed with fresh diced watermelon, 1200.0 g, and pureed for one minute in a blender. Then the puree/juice was heated in a water bath at 40° C. for one hour. The puree/juice was then centrifuged at 2800 rpm for 20 min, and the supernatant was filtered through fluted filter paper. Next the filtrate was heated in a hot-water bath (80° C.) for 1.5 hours; after which the solution was blue in color. The blue solution then was concentrated in a Rotavapor (Buchi, Switzerland) at 40 mmHg pressure and 50° C. and 100 rpm rotation. The final sample that was obtained after 7.5× concentration had an apparent Brix of 75-78, and a maximum absorption of 0.13366 at 595.79 nm in a spectrometer (Perkin Elmer UV/VIS Spectrometer, Lambda 20, USA) after 100× dilution with de-ionized water.

EXAMPLE #3

The blue colored product was prepared from 2,931 g of peeled Huito fruits with fresh watermelon, 11,305 g, and pureed one minute in a blender. The puree/juice was stirred in a 20 L kettle at about 37-40 degree ° C. for one hour after which it was filtered to remove solids by passage through a number #20 mesh size screen and a 5 μm filter at a pump speed of 1.0 liter per minute. The filtrate was returned to the cleaned kettle and heated to about 75-80° C. for 1.5 hours with vigorous stirring. The resultant blue solution was concentrated in a Rotavapor (Buchi, Switzerland) at 40 mmHg pressure and 50° C. and 100 rpm rotation. The final sample had an apparent concentration of 63.25 Brix, and a maximum absorption of 0.57124 at 591.76 nm wavelength in a spectrometer (Perkin Elmer UV/VIS Spectrometer, Lambda 20, USA) after 1000× dilution with de-ionized water. The process is diagramed in FIG. 1.

EXAMPLE #4

Stability test 1 for low pH beverage applications. An 8 week accelerated shelf-life stability was performed on three typical beverage formulations: a dairy-based beverage, a vitamin-enhanced water, and a lemonade beverage containing approximately 10% juice. The pH of the formulations was between 2.8 and 3.2, and the use rate of the color preparation of Example 3 was 0.05%. The accelerated condition was a 90° F. hot box, while a refrigerated 40° F. cold box sample served as the control. Samples were visually evaluated and monitored for color change using a Hunter Color Lab calorimeter (Color Quest XE, USA). Calculated DEcmc values represent the change in color compared to the control based on L a b data.

After 8 weeks, the dairy-based formula exhibited an approximate color fade of 20-25% with a change from light blue to a more grayish blue. The lemonade formula showed an approximate color fade of 30-35% with browning of 20-25% and a change from a grayish blue to green. This was most likely due to browning of the juices which when combined with the blue color resulted in a shade of green.

After 8 weeks the enhanced water formula demonstrated an approximate color fade of 20-25% with browning of 20% and a slight change towards green. Light stability testing (Atlas Suntester XLS+, window glass filter, E 765 w/m$^2$) consisting of a 6 hr accelerated light exposure using simulated daylight showed less than 30% fading in all three beverage formulations.

TABLE 2

| Beverage | 8 Week Accelerated Stability DEcmc (RSIN Mode) | 6 Hour Light Stability DEcmc (RSIN Mode) |
|---|---|---|
| Dairy Base | 2.90 | 0.93 |
| Lemonade | 4.81 | 1.22 |
| Enhanced water | 4.00 | 2.39 |

Stability test 2 for low pH beverage applications. An additional accelerated test was performed on a beverage containing the blue color made from a more concentrated color juice batch. The beverage was a simple sugar-acid tasting solution. This beverage only experienced a slight fade of approximately 5% after 8 weeks. Light stability testing showed very little color change whatsoever.

TABLE 3

| Beverage | 8 Week Accelerated Stability DEcmc (RSIN Mode) | 6 Hour Light Stability DEcmc (RSIN Mode) |
|---|---|---|
| Sugar-acid tasting solution | 1.30 | 0.43 |

Stability test 3 for low pH beverage applications. A pilot scale-up of the blue color using locally sourced materials was set up in a simple sugar-acid tasting solution. After 8 weeks, a fade of approximately 20% was observed. Light stability testing showed a color change of approximately 25-30%.

TABLE 4

| Beverage | 8 Week Accelerated Stability DEcmc (TTRAN Mode) | 6 Hour Light Stability DEcmc (TTRAN Mode) |
|---|---|---|
| Sugar-acid tasting solution | 3.37 | 4.17 |

Stability test 4 for low pH beverage applications. A larger commercial preparation of the blue color was set up in an enhanced water beverage. This was set up both with and without ascorbic acid (approximately 100% RDI Vitamin C). After 8 weeks, a fade of approximately 30-35% was observed in the sample with Vitamin C. This also had a color shift towards a teal blue-green. The sample without Vitamin C showed fading of approximately 20-25% with a color shift towards a more purple blue. The effect of Vitamin C on color stability is similar to what would be expected for other colors from nature such as those which are anthocyanin based. Light stability testing showed a color change of approximately 30% in the formulation without Vitamin C and less than 30% in the formulation with. In general, in stability tests, color fade and changes in hue were within acceptable limits for commercial products and of similar magnitudes to those commonly known for anthocyanin food colorants.

TABLE 5

| Beverage | 8 Week Accelerated Stability DEcmc (TTRAN Mode) | 6 Hour Light Stability DEcmc (TTRAN Mode) |
|---|---|---|
| Enhanced Water with Vitamin C | 7.85 | 3.13 |
| Enhanced Water without Vitamin C | 3.53 | 5.21 |

EXAMPLE #5

Application test 1. The blue color was added to a typical ice cream base. The resultant color in application was a light blue shade.

Application test 2. The blue color was added to a cracker base and then baked in an oven. The resultant color in application was a medium blue color with a slight greenish/brown tint. The blue color was also added to a typical cereal base. After going through a commercial extrusion process, the resultant color was a grayish blue. These colors were examined after 6 months ambient storage and showed little fading.

Application test 3. The blue color was added to a gummy base as well as a pectin base. The resultant color was an attractive deep blue. The use rate was lowered in the gummy base to provide a lighter shade of blue. Blending with additional colors from nature provided attractive shades of green and purple in the gummies.

EXAMPLE #6

Application test. The blue color was added to a cracker base and then baked in an oven. The resultant color in application was a medium blue color with a slight greenish/brown tint. The blue color was also added to cereal base. After going through a commercial extrusion process the resultant color was a grayish blue.

EXAMPLE #7

The filtered Huito fruit juice was obtained by the procedure of Example #1, but without the addition of beta-glucosidase. 20.0 g of the juice was mixed with a 5.0 g of 10% NaOH solution. The mixture was heated to 35-40° C., and allowed to stand at room temperature for about 3 hours. The pH of the mixture was adjusted to pH 4.3 by adding 2.08 g of citric acid and 0.04 grams of beta-glucosidase was then added to the solution and mixed well.

Five grams of the above solution were added to a test tube (25 ml), and another five grams of liquid test materials from fruits, vegetables, or de-ionized water, were added to the test tube, and mixed well. Samples were heated to 80-90° C. for 2 hours until the color was stable. All samples showed colors ranging from reddish to brown. Samples were filtered if necessary.

The absorption maximum wavelength for each of the above colorants were measured in a spectrometer (Perkin Elmer UV/VIS Spectrometer, Lambda 20, USA), and the results are shown in Table 6.

TABLE 6

| Test Materials added | λ max | Visual Color |
|---|---|---|
| Watermelon concentrate, 65Brix | 531.82 | Reddish brown |
| Cantaloupe juice | 540.32 | Reddish brown |
| Green bean sprout solution | 528.66 | Reddish brown |
| Celery juice | 538.03 | Reddish brown |
| Sweet yellow onion solution | 534.17 | Reddish brown |
| De-ionized water (control) | 576.06 | Reddish brown |

EXAMPLE #8

*Gardenia* juice, six grams, was added to a test tube (25 ml). Then 0.20 g of beta-glucosidase and 0.10 g of 10% w/w NaOH solution were added to the test tube, and mixed well. The pH was thereby adjusted from 3.99 to 4.60. The *Gardenia* juice obtained was heated in a 60° C. water bath for one hour, then watermelon concentrate, five grams, was added and mixed well. The mixture sample was heated to 70° C. and held for 1 hour. The color of the sample was converted from red to green.

EXAMPLE #9

A blue color juice concentrate was prepared by mixing 49.4 g of diced Huito fruit with 50.0 g of pumpkin juice concentrate (Diana Naturals) and 150 g of de-ionized water. The mixture was blended at a high speed for 2×60 seconds. Then the puree/juice was heated on a heating plate to a temperature of 42° C. and held for 30 minutes, and then was centrifuged at 3500 rpm for 15 min, and the supernatant was filtered through No. 4 Whatman filter paper. Next the filtrate was heated on a heating plate at a temperature of 60° C. and held for one and a half hours. A desirable blue color was generated with L value 25.68, a-value 0.09, and b value −3.26, measured on a Hunter Colormeter. The blue solution then was concentrated in a Rotavapor (Buchi, Switzerland) at 40 mmHg pressure and 50° C. and 100 rpm rotation. The final sample that was obtained after 7.3× concentration had an apparent Brix of 67.13.

EXAMPLE #10

A blue/green color juice was prepared with Huito fruit and yellow bell pepper juice concentrate. Fifty grams of yellow bell pepper juice concentrate (Diana Natural) were mixed with 250 g of de-ionized water. The solution was heated to boiling and filtered to remove flocculate through a No.4 Whatman filter paper. The filtrate was then mixed with 64.5 g of diced Huito fruit, and the mixture was blended at a high speed (Waring blender) for 2×60 seconds. A preheating step took place on a heating plate at 42° C. for 30 minutes. After removal of insoluble material by centrifugation at 3500 rpm for 15 min and filtration through No. 4 Whatman filter paper, the filtrate was heated on a heating plate at a temperature setting of 62° C. for one hour. A blue/green color was generated with L value 15.87, a-value −2.85, and b value −6.26, measured with a Hunter Colormeter. The blue/green solution then was concentrated in a Rotavapor (Buchi, Switzerland) at 40 mmHg pressure and 50° C. and 100 rpm rotation. The final sample that was obtained after 10× concentration had an apparent Brix of 65.2.

CITED DOCUMENTS

Endo, T. and Taguchi, H. The constituents of *Gardenia jasminoids:* Geniposide and genipin-gentiobioside. Chem. Pharm. Bull. 1973
U.S. Pat. No. 4,878,921, Kogu et al, issued Nov. 7, 1989
Sampaio-Santos and Kaplan, J. Braz. Chem. Soc. 12 (2001)
Andreason and Bremer, Am. J. Botany 87 1731-1748 (2000)
Form FDA 2438g (10/91)
Paik, Y.; Lee, C.; Cho, M.; and Hahn, T. in J. Agric. Food Chem. 2001, 49, 403-432.
U.S. Pat. No. 4,247,698, Toyama et al, Jan. 27, 1981

What is claimed is:

1. Method of preparing stable, natural colors, the method resulting in a color having an increased -b value based on the CIE LAB scale when the mixture defined in step (a) is compared with the processed mixture defined in step (c), comprising
   a. forming a mixture comprising:
      (i) juice from fruit of a plant of the Rubiaceae Family, which contains sufficient genipin or derivatives of genipin, selected from genipin gentiobioside, geniposide, geniposidic acid, and gardenoside, capable of reacting with the juice or liquefied material defined in (a)(ii) to produce a product of the desired color;
      (ii) other juice or liquefied material made by the chemical or mechanical liquification of a solid material, from a suitable food-grade source selected from fruits, grains, seeds, beans, nuts, vegetables, plant materials, milk, dairy products, egg, meat, seafood, shellfish, microbial and algal material, and by-products from such sources, that contain components capable of providing the desired color when combined with the juice defined in (a)(i);
   b. processing said mixture using conventional juice processing methods selected from milling, pressing, extracting, and combinations of those processing methods, at a pH of from about 3.5 to about 7; and
   c. stabilizing the mixture against microbial growth, oxidation, organoleptic deterioration and to provide a stabilized color intensity, by applying a heat treatment.

2. Method according to claim 1 in which the genipin source is Huito, *Genipa americana*.

3. Method according to claim 1 in which the genipin source is selected from the whole fruit, fruit juice, fruit puree, fruit juice concentrate, dried powder form of fruits or juice, and water insoluble part of fruits derived, in whole or in part, from Huito, *Genipa americana,* and combinations thereof.

4. Method according to claim 1 in which the genipin source is *Gardenia jasminoides* Ellis, selected, in whole or in part, from the whole fruit, fruit juice, fruit puree, fruit juice concentrate, dried powder form of fruits or juice, and water insoluble parts of fruits derived, in whole or in part, from *Gardenia jasminoides* Ellis, its varieties or relatives in the *Gardenia* genus, and combinations thereof.

5. Method according to claim 1, wherein food grade source (a)(ii) is selected from concentrates, purees and dried forms, and combinations thereof.

6. Method according to claim 1, wherein food grade source (a)(ii) is selected from watermelon, white grape, pineapple, tamarind, green cabbage, carrot, orange, apple, pear, red grape, blueberry, bean sprout, cantaloupe, lychee, peach, papaya, lemon, acai, plum, guava, passion fruit, tangerine, borojo, cupuacu, banana, pumpkin, bell peppers, and combinations thereof.

7. Method according to claim 6, wherein food grade source (a)(ii) is watermelon, and the resulting color is blue.

8. Method according to claim 1, wherein the processing includes pH adjustment.

9. Method according to claim 1, wherein food grade source (a)(ii) contains nitrogenous compounds selected from amino acids, polypeptides, proteins, and compounds with one or more primary amine groups, and combinations thereof.

10. Stable natural juice-based colorant made according to the method of claim 1.

11. Stable natural juice-based colorant made according to the method of claim 2.

12. Stable natural juice-based colorant made according to the method of claim 4.

13. Stable natural juice-based colorant made according to the method of claim 7.

14. A food product comprising the colorant of claim 10.

15. A food product comprising the colorant of claim 11.

16. A food product comprising the colorant of claim 13.

17. A food product comprising the colorant of claim 12.

18. The method according to claim 1 wherein step (b) takes place at a pH of from about 4 to about 6.

19. The method according to claim 1 wherein the color prepared is blue.

20. The method according to claim 19 wherein the material used in (a)(ii) is a juice.

21. The method according to claim 19 wherein juice from *Genipa americana* is reacted with watermelon juice.

* * * * *